(12) United States Patent
Kishi

(10) Patent No.: US 8,982,252 B2
(45) Date of Patent: Mar. 17, 2015

(54) IMAGE SENSING DEVICE USING A PHOTOELECTRIC CONVERTER AND A CONTROL METHOD THEREFOR

(75) Inventor: Takafumi Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/359,002

(22) Filed: Jan. 26, 2012

(65) Prior Publication Data

US 2012/0126097 A1 May 24, 2012

Related U.S. Application Data

(63) Continuation of application No. 11/436,795, filed on May 17, 2006, now Pat. No. 8,115,837.

(30) Foreign Application Priority Data

May 17, 2005 (JP) .................................. 2005-144539
Apr. 26, 2006 (JP) .................................. 2006-122532

(51) Int. Cl.
| | |
|---|---|
| H04N 9/64 | (2006.01) |
| H04N 3/14 | (2006.01) |
| H01L 27/00 | (2006.01) |
| H04N 5/365 | (2011.01) |
| H04N 5/353 | (2011.01) |
| H04N 5/357 | (2011.01) |
| H04N 5/262 | (2006.01) |

(52) U.S. Cl.
CPC .............. *H04N 5/365* (2013.01); *H04N 5/3532* (2013.01); *H04N 5/3575* (2013.01)
USPC ......... 348/255; 348/241; 348/308; 250/208.1

(58) Field of Classification Search
USPC ................ 348/296.297, 302, 303, 245, 229.1
See application file for complete search history.

(56) References Cited

U.S. PATENT DOCUMENTS

| | | | | |
|---|---|---|---|---|
| 7,586,526 | B2 * | 9/2009 | Kurokawa et al. | 348/243 |
| 2001/0025969 | A1 * | 10/2001 | Inui | 257/225 |
| 2001/0028392 | A1 * | 10/2001 | Yamamoto et al. | 348/207 |
| 2002/0140844 | A1 * | 10/2002 | Kurokawa et al. | 348/362 |
| 2004/0189846 | A1 * | 9/2004 | Hiyama et al. | 348/308 |
| 2005/0243193 | A1 * | 11/2005 | Gove et al. | 348/241 |
| 2006/0192864 | A1 * | 8/2006 | Mauritzson | 348/241 |

* cited by examiner

*Primary Examiner* — Twyler Haskins
*Assistant Examiner* — Carramah J Quiett
(74) *Attorney, Agent, or Firm* — Carter, DeLuca, Farrell & Schmidt, LLP

(57) ABSTRACT

An image sensing apparatus has a plurality of pixels arranged two dimensionally, each pixel containing a photoelectric converter that outputs a photoelectrically converted signal in response to a quantity of received light, an output unit containing a clamping circuit, a signal supply circuit that outputs a reference signal to the clamping circuit, a control unit that controls to clamp the reference signal prior to outputting the photoelectrically converted signal from the pixel to the clamping circuit, output the photoelectrically converted signal to the clamping circuit, and then output a noise signal from the pixel to the clamping circuit, and a differential circuit that subtracts the noise signal from the photoelectrically converted signal processed by the clamping circuit.

8 Claims, 14 Drawing Sheets

IMAGE SENSING DEVICE USING A PHOTOELECTRIC CONVERTER AND A CONTROL METHOD THEREFOR

CROSS REFERENCE TO RELATED APPLICATIONS

This application is a continuation of U.S. patent application Ser. No. 11/436,795, filed May 17, 2006, now U.S. Pat. No. 8,115,837, which claims the benefit of Japanese Patent Application No. 2005-144539, filed May 17, 2005 and Japanese Patent Application No. 2006-122532, filed Apr. 26, 2006.

FIELD OF THE INVENTION

The present invention relates to an image sensing device that senses an object image using a photoelectric converter and a control method therefor.

BACKGROUND OF THE INVENTION

Conventionally, implementing an electronic shutter operation by executing a reset scan by pixel or by line to remove unneeded charges accumulated at the pixels and then carrying out a scan by pixel or by line to output the signal charge after a predetermined period of time has elapsed for each pixel or for each line is known.

A description is now given of an electronic shutter operation in an image sensing apparatus that uses an image sensing device that employs a conventional XY address-type scan method. Specifically, using FIG. 11 and FIG. 12, a description is given of the structure of the conventional image sensing device and the drive method called rolling electronic shutter operation among the electronic shutter operations.

FIG. 11 is a schematic diagram showing the structure of an image sensing device employing the conventional XY address-type scan method.

Reference numeral 101 designates a unit pixel, with multiple unit pixels 101 arranged in a matrix. Reference numeral 102 designates a photodiode (hereinafter "PD") that converts light of an object image into a signal charge. Reference numeral 104 designates an area that temporarily stores the signal charge (that is, a floating diffusion part, hereinafter referred to as "FD"). Reference numeral 103 designates a transfer switch that transfers the signal charge generated at the PD 102 to the FD 104 using a transfer pulse φTX. Reference numeral 105 designates a MOS amplifier that functions as a source follower. Reference numeral 106 designates a selection switch that selects a unit pixel 101 using a selection pulse φSEL. Reference numeral 107 designates a reset switch that resets the FD 104 to a predetermined potential ($V_{DD}$) using a reset pulse 100 RES. A floating diffusion amplifier is composed of the ED 104, the MOS amplifier 105 and a constant current source 105 that is described below. The signal charge of the unit pixel 101 selected by the selection switch 106 is converted into voltage and output to an output circuit 111 over a signal line 108. Reference numeral 109 designates the constant current source that becomes a load of the MOS amplifier 105.

By the driving of a horizontal scan circuit 110, the output from the pixels 101 are output from the output circuit 111 to en output line 112. In addition, reference numeral 113 designates a vertical scan circuit that controls the driving of the pixels by supplying the respective drive signals φTX, φSEL and φRES to the switches 103, 106 and 107, respectively. In φTX, φSEL and φRES, respectively, the drive signals supplied to an nth scan line selected for scanning by the vertical scan circuit 113 are written as φTXn, φφSELn and φRESn.

FIG. 12 is a schematic diagram showing drive pulse and sequence of a rolling electronic shutter operation. It should be noted that FIG. 11 describes an example of the driving of from a line n to a line n+3 by the vertical scan circuit 113.

With the rolling electronic shutter operation, in line n, first, between a time t31 and a time t32, pulses are applied to φRESn and φTXn and the transfer switch 103 and the reset switch are turned on, removing the unneeded charges accumulated in PD 102 and FD 104 of each pixel on the line n and resetting them to a predetermined potential. At time t32, the transfer switch 106 is turned off and the light charge generated at the PD 102 begins to be accumulated. The charge generated at the PD 102 by photoelectric conversion is called "light charge", hereinafter.

Next, at a time t34, a pulse is applied to φTXn and the transfer switch 103 is turned on, transferring the light charge accumulated in the PD 102 to the FD 104. It should be noted that the reset switch 107 is turned off prior to the transfer. From time 132 to a time t35, when φTXn becomes low and transfer ends, is a charge accumulation time. After the transfer in the line n ends, a pulse is applied to φSELn and the selection switch 106 is turned on, converting the light charge held in the FD 104 to voltage and outputting it to the output circuit 111. The output circuit 111 is driven by the horizontal scan circuit 110, and the signals temporarily held at the output circuit 111 are output in succession from a time t36. From the start of transfer at time t34 to the end of output at time t37 is T3read, and the time from time t31 to time t33 is T3wait. The process is the same for the remaining lines, with the time from the start of transfer to the end of output being T3read and the time from the start of reset of one line to the start of reset of the next line being T3wait.

A problem with the rolling electronic shutter shown in FIG. 12 is that the charge accumulation timing shifts between the top part of the screen and the bottom part of the screen time by the length of time required to scan the screen. This is because the time T3wait from the start of reset of one line to the start of reset of the next line must be set to a duration that is greater than the time T3read from the start of transfer to the end of output. If T3wait is shorter than T3read, the following problem occurs when attempting to make the charge accumulation time the same for all lines: Specifically, before output of the signals of line n temporarily held in the output circuit 111 ends, the signals of the next line are transferred to the output circuit 111 while the signals of the pixels of line n still remain in the output circuit 111. This not only makes it impossible to output the signals of the pixels of a part of the line n, but the remaining signals of the line n are also added to the signals of line n+1, leading to the wrong signals being output as the signals of the line n+1. In addition, if the signal output cannot be scanned from the output circuit 111 at high speed, then, particularly in the case of a large number of pixels, the shift in the charge accumulation timing (that is, the image sensing timing) from the top of the image to the bottom of the image increases.

Moreover, as is described in Japanese Patent Application Laid-Open No. 2003-17677, there is also a MOS-type image sensing device that performs reset and transfer of charges collectively. The sequence of operations of this sort of operation is shown in FIG. 13. In FIG. 13, all the lines are reset simultaneously from a time t41 to a time t42. In addition, between a time t43 and a time t44 transfer of charges is also performed simultaneously. Hereinafter, this type of electronic shutter is referred to as a collective transfer electronic shutter. With a collective transfer electronic shutter, the charge accumulation time for all lines is from t42 to t44, achieving an electronic shutter with no shift in charge accumulation timing from the top to the bottom of the image.

In addition, in order to carry out reset and transfer of charges at high speed, there is also a MOS-type image sensing device that performs the sequence of operations shown in FIG. 14 designed to increase the speed of reset and transfer of charges. A description is given of this sequence using FIG. 11 and FIG. 14.

First, by applying pulses to φRESn and φTXn from a time t51 to a time t52, the reset switch 107 and the transfer switch 103 of each pixel on the line n are turned on, resetting the PD 102 and FD 104 of each pixel on the line n. From time t52 the charge accumulation that generates a light charge on the PD 102 of each pixel on the line n starts, and at a time t53 the resetting of all the lines up to and including the last line ends. From a time t54 to a time t55 a pulse is applied to φTXn, turning on the transfer switch 103 of each pixel on the line n and transferring the light charge accumulated in PD 102 to the FD 104 of each pixel on the line n. The time from time t52 to time t55 is the charge accumulation time for line n. Transfers for line n+1 and all lines thereafter are carried, out in succession from time t55, with transfers for all lines completed at a time t57.

After transfer of the light charge of each pixel on the line n ends, a pulse is applied to φSEL at a time t55, turning switch 100 on. This causes the charge held in the FD 104 to be converted into voltage by a source follower circuit composed of the MOS amplifier 105 and the constant current source 109 and output to the output circuit 111. The signals temporarily held in the output circuit 111 are output in succession to the output line 112 from time t56 by the horizontal scan circuit 110 control. Output of line n+1 is carried out from a time t58, after all the signals of line n have been output from the output circuit 111. The sequence shown in FIG. 14 enables the time from the start of scanning of one line to the start of scanning of the next line to be determined independently of the output time, thus enabling distortion of an image by the rolling electronic shutter to be reduced. This sort of electronic shutter is referred to as a rolling transfer electronic shutter. With the collective transfer electronic shutter, the rolling electronic shutter and the rolling transfer electronic shutter there is no need to use a mechanical shutter, and thus these shutters are optimal for moving image applications.

At the same time, a structure is known that removes noise unique to the pixels from the light signals output from the pixels. As one example thereof, the light signals output from the pixels on one line are temporarily held in capacitors, respectively, the noise signals of the same pixels are temporarily held in other capacitors prior to or after light signal output, and the noise signals are then subtracted from the light signals at each of the pixels. This operation is performed sequentially for all of the lines. Configuring and controlling an apparatus in the foregoing manner enables the noise component to be reduced.

However, because there are slight differences between the capacitors that holds the light signals and the capacitors that holds the noise signals, to further reduce the noise component accurately a structure is known in which clamping circuits are used. With a structure that use clamping circuits, in the case of a rolling electronic shutter, first, the noise signals of the pixels of the output line are output and made reference levels of the clamping circuits, and at the same time the noise signals are output and held in capacitors. Thereafter, the light signals are output and held in other capacitors after being clamped by the clamping circuit. Therefore, the light signals are clamped by the noise signals, enabling light signals minus noise signals to be obtained from the clamping circuits.

By contrast, in the case of a collective transfer electronic shutter or a rolling transfer electronic shutter, the transfer of the light charge from the PD to the FD is carried out prior to output. As a result, it is not possible to realize a sequence of operations in which the noise signal is output and then the light signal is output after the noise signal is clamped during readout of the light signal. The light charge has already been transferred to the FD when the FD is initially scanned, and therefore the voltage of the FD which is output first becomes the reference level of the clamping circuit. If the noise signal is then output, then the output from the clamping circuit becomes the noise signal minus the light signal, which would be outside the operating range of the amplifier used in the later stage of the clamping circuit.

SUMMARY OF THE INVENTION

The present invention has been made in light of the above-described situation, and has as its object to keep the post-clamping output levels within a predetermined range when using clamping circuits.

According to the present invention, the foregoing object is attained by providing an image sensing apparatus comprising: a plurality of pixels arranged two dimensionally, each pixel containing a photoelectric converter that outputs a photoelectrically converted signal in response to a quantity of received light; an output unit containing a clamping circuit; a signal supply circuit that outputs a reference signal to the clamping circuit; a control unit that controls to clamp the reference signal prior to outputting the photoelectrically converted signal from the pixel to the clamping circuit, output the photoelectrically converted signal to the clamping circuit, and then output a noise signal from the pixel to the clamping circuit; and a differential circuit that subtracts the noise signal from the photoelectrically converted signal processed by the clamping circuit.

According to the present invention, the foregoing object is also attained by providing an image sensing apparatus capable of being driven by multiple scan methods including a first scan method and a second scan method, the image sensing apparatus comprising: a plurality of pixels arranged two dimensionally, each pixel containing a photoelectric converter that outputs a photoelectrically converted signal in response to a quantity of received light; an output unit containing a clamping circuit; a signal supply circuit that outputs a reference signal to the clamping circuit; a control unit that with a first scan method clamps a noise signal from the pixels with the clamping circuit and then outputs the photoelectrically converted signal to the clamping circuit, and with a second scan method controls to clamp the reference signal prior to outputting the photoelectrically converted signal from the pixel to the clamping circuit, output the photoelectrically converted signal to the clamping circuit, and then output a noise signal from the pixel to the clamping circuit; and a differential circuit that subtracts the noise signal from the photoelectrically converted signal processed by the clamping circuit.

Further, the foregoing object is also attained by providing a control method for an image sensing apparatus comprising a plurality of pixels arranged two dimensionally, each pixel containing a photoelectric converter that outputs a photoelectrically converted signal in response to a quantity of received light, an output unit containing a clamping circuit, and a signal supply circuit that outputs a reference signal to the clamping circuit, the method comprising: clamping the reference signal prior to outputting the photoelectrically converted signal from the pixel to the clamping circuit; outputting the photoelectrically converted signal to the clamping circuit; outputting a noise signal from the pixel to the clamping circuit; and subtracting the noise signal from the photoelectrically converted signal processed by the clamping circuit.

Furthermore, the foregoing object is also attained by providing an image sensing apparatus comprising: a plurality of pixels arranged two dimensionally, each pixel containing a photoelectric converter that outputs a photoelectrically converted signal in response to an amount of received light, a storage unit that stores a signal from the photoelectric converter, and a transfer switch that transfers a signal from the photoelectric converter to the storage unit; a mechanical shutter, and a switching unit that switches operations between a first scan sequence for still image sensing and a second scan sequence for moving image sensing, wherein in the first can sequence, transference of the photoelectrically converted signals from the photoelectric converters to the storage units and output of the photoelectrically converted signals from the pixels are sequentially performed by a predetermined number of line/lines, and in the second scan sequence, photoelectrically converted signals are collectively transferred from the photoelectric converters contained in the plurality of pixels to the storage units, and then the photoelectrically converted signals are sequentially output from the plurality of pixels by a predetermined number of line/lines, or photoelectrically converted signals are sequentially transferred from the photoelectric converters to the storage units by a predetermined number of line/lines at a first period, and then the photoelectrically converted signals are sequentially output from the plurality of pixels by a predetermined number of line/lines at a second period, with the first period being shorter than the second period.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
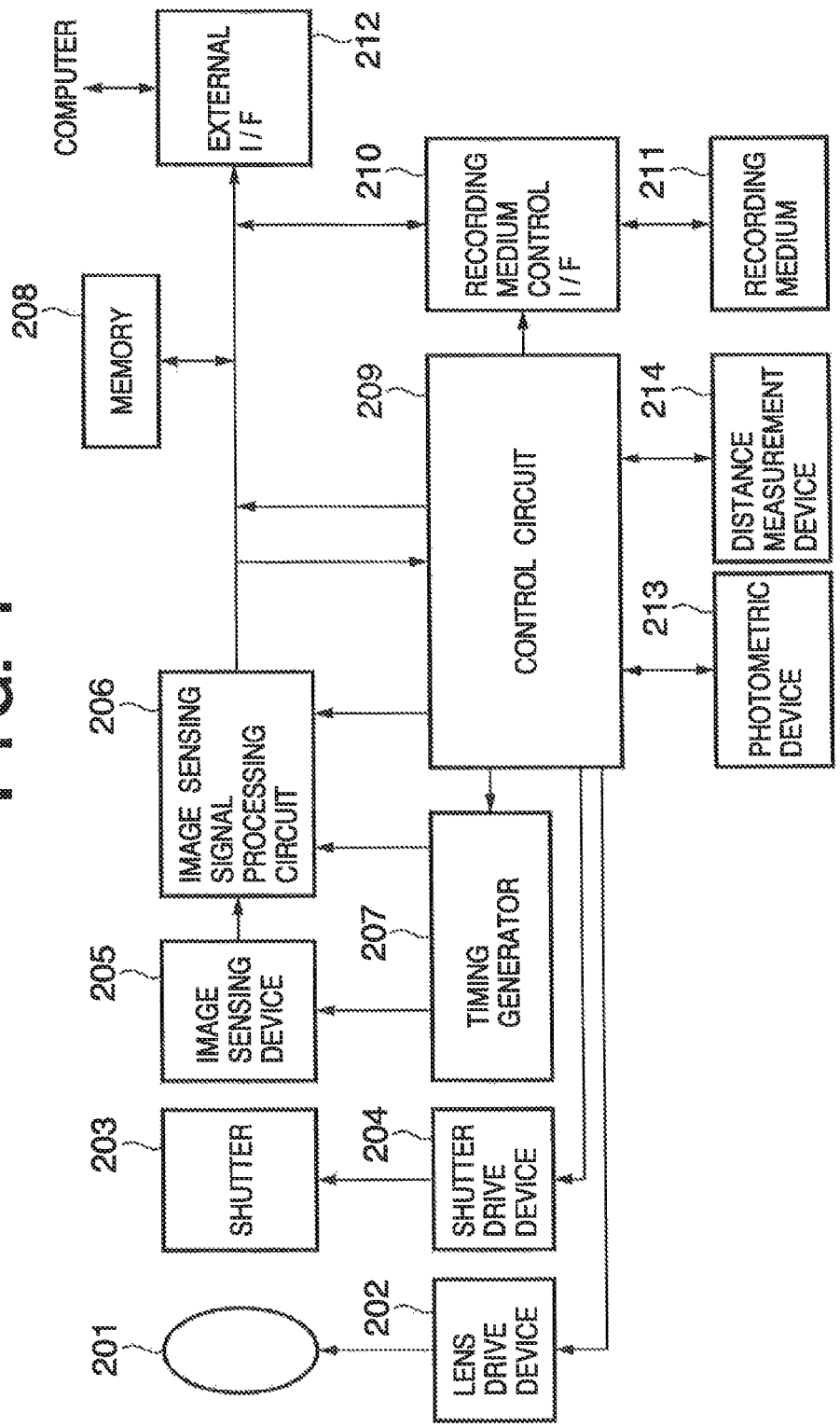
FIG. 1 is a block diagram showing a schematic structure of an image sensing apparatus according to an embodiment of the present invention.

FIG. 1 is a block diagram showing the schematic structure of an image sensing apparatus of an embodiment of the present invention.

In FIG. 1, reference numeral 201 designates a lens unit for focusing an optical image of an object on an image sensing device 205, with lens zoom, focus and aperture control performed by a lens drive device 202. Reference numeral 203 designates a shutter, which is controlled by a shutter drive device 204. Reference numeral 205 designates the image sensing device that converts the optical image of the object focused by the lens unit 201 into an electrical image signal. Reference numeral 206 designates an image sensing signal processing circuit with the capability to amplify the image signal output from the image sensing device 205, to perform analog-to-digital (A/D) conversion on the image signal, and to carry out a variety of corrections on the A/D converted image signal, and the capability to compress the signal. Reference numeral 207 designates a timing generator that outputs a variety of timing signals to the solid-state image sensing device 205 and to the image sensing signal processing circuit 206. Reference numeral 208 designates a memory for temporarily storing image data. Reference numeral 209 designates a control circuit for controlling a variety of calculations as well as the image sensing apparatus as a whole. Reference numeral 210 designates an interface for recording on and reading from a recording medium (referred to as recording medium control I/F, hereinafter). Reference numeral 211 designates a detachable recording medium such as a semiconductor memory which storing and providing image data. Reference numeral 212 designates an interface for communicating with an external computer or the like. Reference numeral 213 designates a photometric device, which measures light and determines the brightness of the object. The control circuit 209 adjusts the aperture of the lens unit 201 according to the results of the determination made by the photometric device 213 using the lens drive device 202. Reference numeral 214 designates a distance measurement device, which measures the distance to the object and detects a focus state. The control circuit 209 adjusts the focus lens of the lens unit 201 according to the detected focus state using the lens drive device 202.

Figure 2:
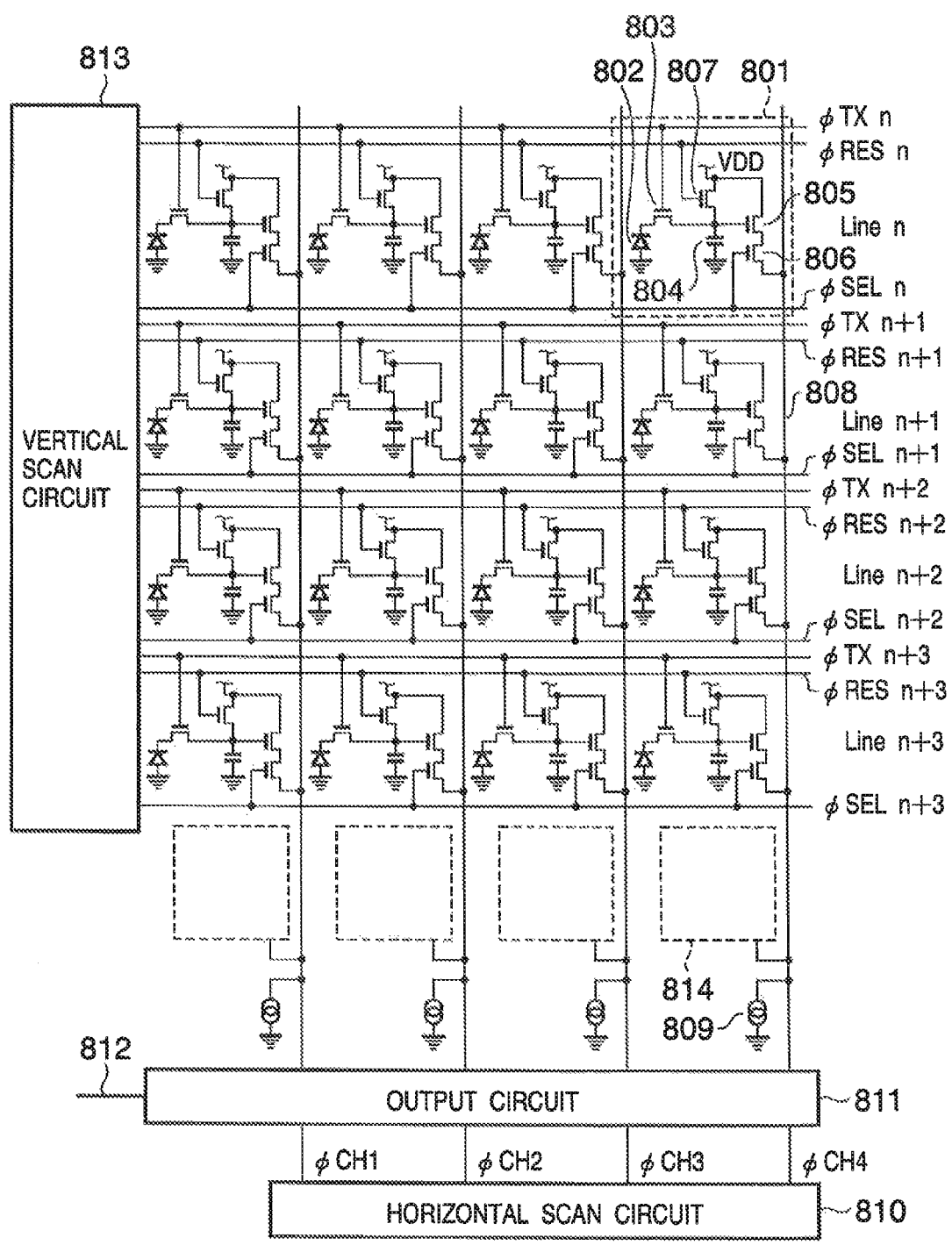
FIG. 2 is a diagram showing a schematic structure of an image sensing device of the image sensing apparatus according to the embodiment of the present invention.

FIG. 2 is a diagram showing the schematic structure of an image sensing device of the image sensing apparatus of an embodiment of the present invention.

In FIG. 2, reference numeral 801 designates a unit pixel, with multiple unit pixels 801 arranged in a matrix. Reference numeral 802 designates a photodiode (hereinafter "PD") that converts light of an image of an object into a signal charge. Reference numeral 804 designates an area that temporarily stores the signal charge (that is, a floating diffusion part, hereinafter referred to as "FD"). Reference numeral 803 designates a transfer switch that transfers the charge generated at the PD 802 to the FD 804 in response to a transfer pulse φTX. Reference numeral 805 designates a MOS amplifier that functions as a source follower. Reference numeral 806 designates a selection switch that selects a unit pixel 801 using a selection pulse φSEL. Reference numeral 807 designates a reset switch that resets the FD 804 to a predetermined potential ($V_{DD}$) using a reset pulse φRES. A floating diffusion amplifier is composed of the FD 804, the MOS amplifier 805 and a constant current source 809 that is described below. The charge of the unit pixel 801 selected by the selection switch 806 is converted into voltage and output to an output circuit 811 over a signal output line 808. Reference numeral 809 designates the constant current source that becomes a load of the MOS amplifier 805. Reference numeral 814 designates a dummy pixel, which outputs a signal to the signal output line 808 when a dummy pixel selection circuit switch 905 described below is turned on.

The output of the pixels 801 is output from the output circuit 811 to an output line 812 by the driving of the horizontal scan circuit 810. In addition, reference numeral 813 designates a vertical scan circuit that controls the driving of the pixels by supplying the respective drive signals φTX, φSEL and φRES to the switches 803, 306 and 807, respectively. In φTX, φSEL and φRES, respectively, the drive signals supplied to an nth scan line selected for scanning by the vertical scan circuit 613 are written as φTXn, φSELn and φRESn.

Figure 3A:
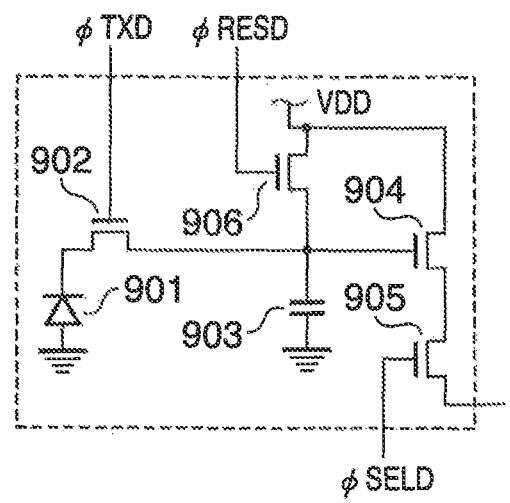
FIGS. 3A, 3B and 3C are schematic diagrams showing examples of general structures of a dummy pixel of according to the embodiment of the present invention.

FIG. 3A is a schematic diagram showing an example of the general structure of the dummy pixel 814.

In FIG. 3A, reference numeral 901 designates a PD that converts the light of the object image into an electric charge. Reference numeral 903 designates an FD, and 902 designates a transfer switch that transfers a signal charge generated at the PD 901 in response to a transfer pulse φTX. Reference numeral 904 designates a MOS amplifier that functions as a source follower. Reference numeral 905 designates a selection switch that selects the dummy pixel using a selection pulse φSELD. Reference numeral 906 designates a reset switch that resets the FD 903 to a predetermined potential ($V_{DD}$) in response to a reset pulse φRESD. A floating diffusion amplifier is composed of the FD 903, the MOS amplifier 904 and the constant current source 809 described above. When the selection pulse φSELD is high, the selection switch 905 is turned on, the dummy pixel is selected, and the charge in the FD 903 of the dummy pixel is converted into voltage and output to the output circuit 811 over the signal output line 808. It should be noted that the dummy pixel exists in order to determine the clamping reference, and therefore the transfer switch 902 is always turned off so that no light charge is output from the dummy pixel. Alternatively, a dummy signal can be obtained even with the transfer switch 902 turned on by shielding the dummy pixel from light so that no light charge is output therefrom.

Figure 3B:
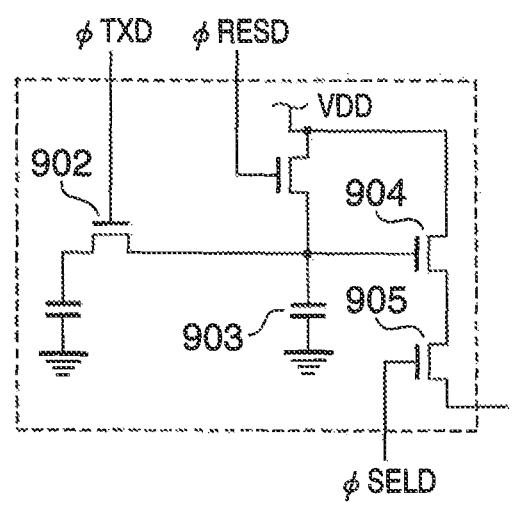

The dummy pixel shown in FIG. 3 may be used in place of the dummy pixel shown in FIG. 3A. This dummy pixel employs a structure that eliminates the PD that takes up a large amount of surface area in an ordinary pixel. Such a structure enables the dummy pixel surface area to be reduced.

Figure 3C:
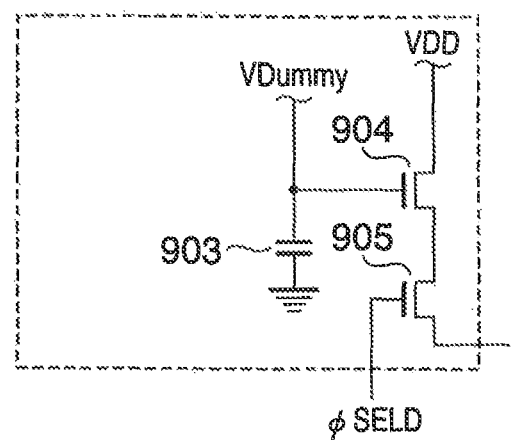

In addition, the dummy pixel shown in FIG. 3C may be used in place of the dummy pixel shown in FIG. 3A. This dummy pixel employs a structure in which a constant voltage is always supplied to the FD 903. Such a structure enables the surface area of the transfer switch and the reset switch to be reduced.

Figure 4:
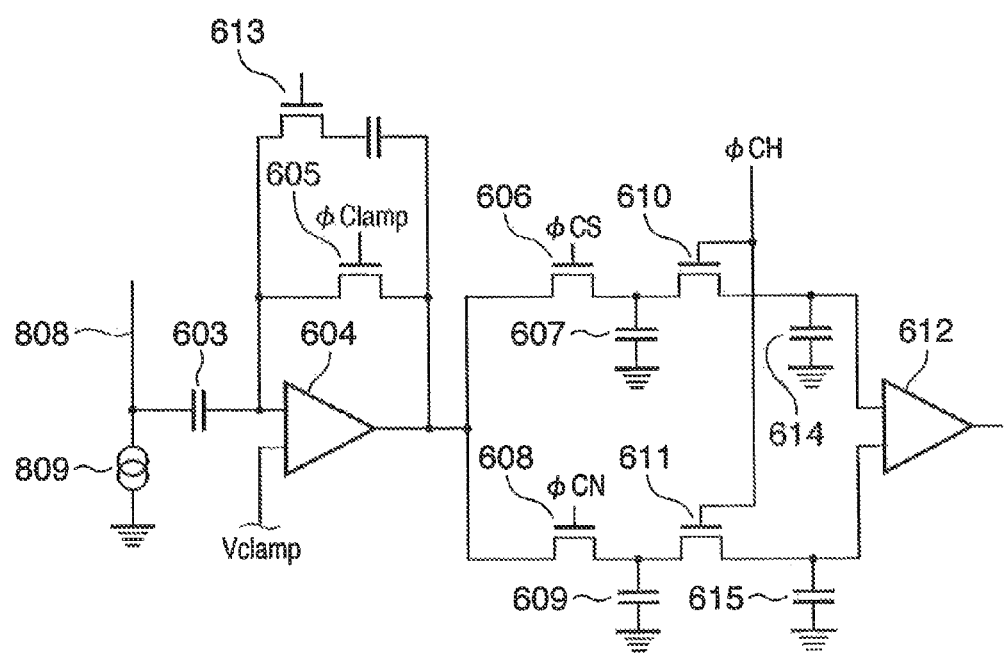
FIG. 4 is a schematic diagram showing an example of the general structure of an output circuit shown in FIG. 2.

FIG. 4 is a diagram showing one example of the schematic structure of the output circuit 811 shown in FIG. 2, and provided for each signal output line 808 (i.e., for each column). In the structure shown in FIG. 4, however, the differential amplifier 612 is not provided for each column but on the output circuit 811 and shared by all columns.

The output circuit 811 shown in FIG. 4 has a clamping circuit and an amplifier for each line of unit pixels 801 arranged in a matrix, and clamps the output at a level suitable for the operating range of the differential amplifier 612 provided in the downstream of the output circuit 811. Reference numeral 805 designates a signal output line as in FIG. 2, and 809 designates the constant current source as in FIG. 2. Reference numeral 503 designates a clamping capacitor. Reference numeral 605 designates a clamping switch and 604 designates an amplifier. Reference numeral 605 designates a switch that selects and transfers a light signal corresponding to the electric charge converted by the PG 802 of the pixel 801 in response to a pulse φCS. Reference numeral 607 designates a capacitor that keeps the voltage proportional to the light signal. Reference numeral 608 designates a switch that selects the reset level (noise signal) of each pixel in response to a pulse φCN. Reference numeral 609 designates a capacitor that holds the reset level (noise signal). Reference numerals 610, 611 designate switches that transfer the output to the differential amplifier 612 in response to a pulse φCH applied by the horizontal scan circuit 810. Reference numeral 613 designates a switch that changes the gain of the amplifier 604. Reference numerals 614, 615 designate capacitances parasitic on the wirings.

Figure 13:
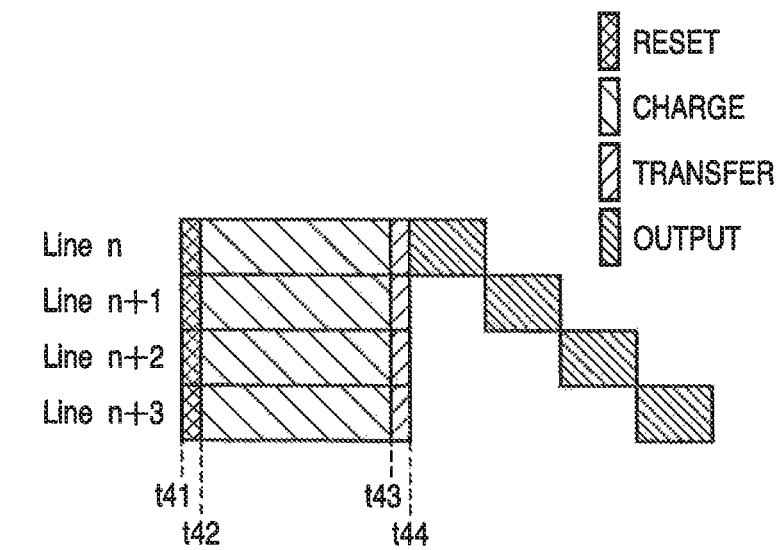
FIG. 13 is a diagram for the purpose of illustrating scanning with a collective transfer electronic shutter.
Figure 14:
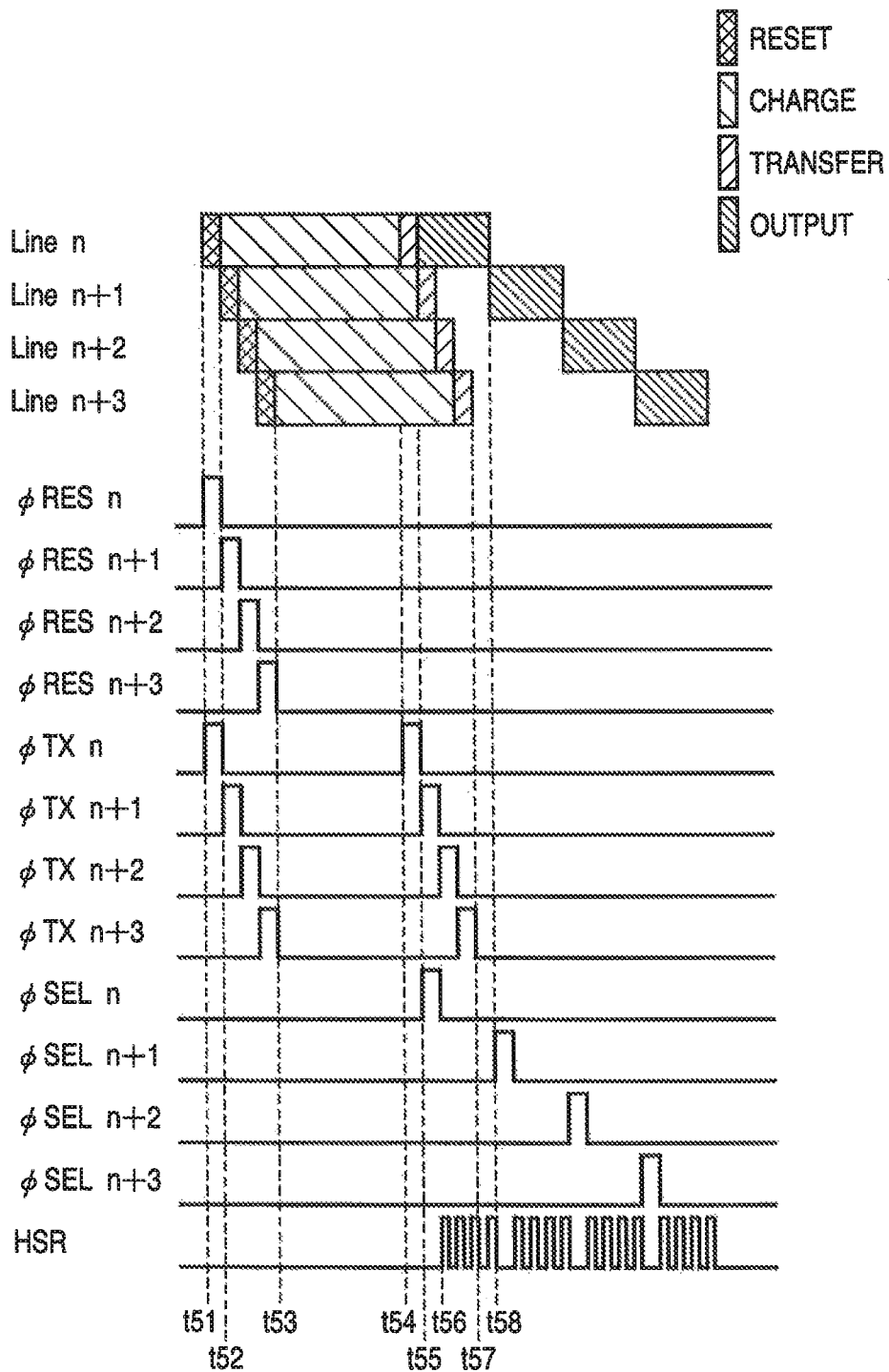
FIG. 14 is a diagram for the purpose of illustrating scanning with a rolling transfer sensor electronic shutter.

The image sensing device having the structure shown in FIGS. 2 through 4 described above can be driven by either a rolling electronic shutter, a collective transfer electronic shutter like that shown in FIG. 13, or a rolling transfer electronic shutter like that shown in FIG. 14.

Figure 5:
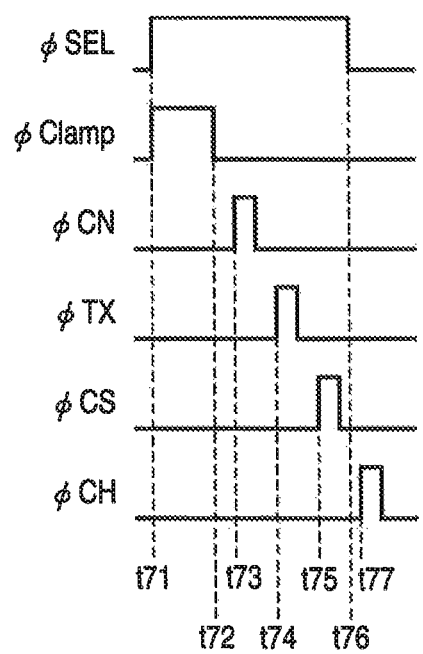
FIG. 5 is a timing chart showing a first scan sequence of the image sensing device according to the embodiment of the present invention.

FIG. 5 is a timing chart showing a first scan sequence of the image sensing apparatus according to the present embodiment. The first scan sequence is carried out where the image sensing device is driven using a rolling electronic shutter, and is executed by the control circuit 209. The description given here is of the readout of a single line.

First, at a time t71, the φSEL and the φClamp are set to high, turning the clamping switch 605 and the selection switch 806 on and outputting the voltage of the FD 804 (the noise signal), which is then made the reference level for the clamping capacitor 603. At this time, the light charge is not yet transferred to the FD 804 from the PD 802 and the FD 804 is reset to a reset voltage. Thereafter, at a time t72, φClamp is set to low, turning the clamping switch 605 off. At a time t73, φCN is set to high, turning the switch 608 on and holding the noise signal amplified by the amplifier 604 at the capacitor 609.

Next, at a time t74, φTX is set to high, turning the transfer switch 803 and transferring the light charge in the PD 802 to the FD 804. Thereafter, at a time t75, φCS is set to high, turning the switch 606 on, which causes the light signal to be clamped by the noise signal by the clamping circuit (i.e., light signal minus noise signal) and amplified by the amplifier 604 and held in the capacitor 607. When the light signal is held in the capacitor 607, at a time t76 φSEL is set to low.

Thereafter, from a time t77, the output circuit 811 sets φCH to high for each column in turn, thereby turning on the switches 610, 611 for each column in turn and causing the differential amplifier 612 to subtract the noise signal from the clamped light signal, resulting in the output of a low-noise light signal.

Thus, as described above, using a clamping circuit and reading a signal with a first scan sequence enables noise to be reduced more effectively than a case in which a clamping circuit is not used.

Figure 6:
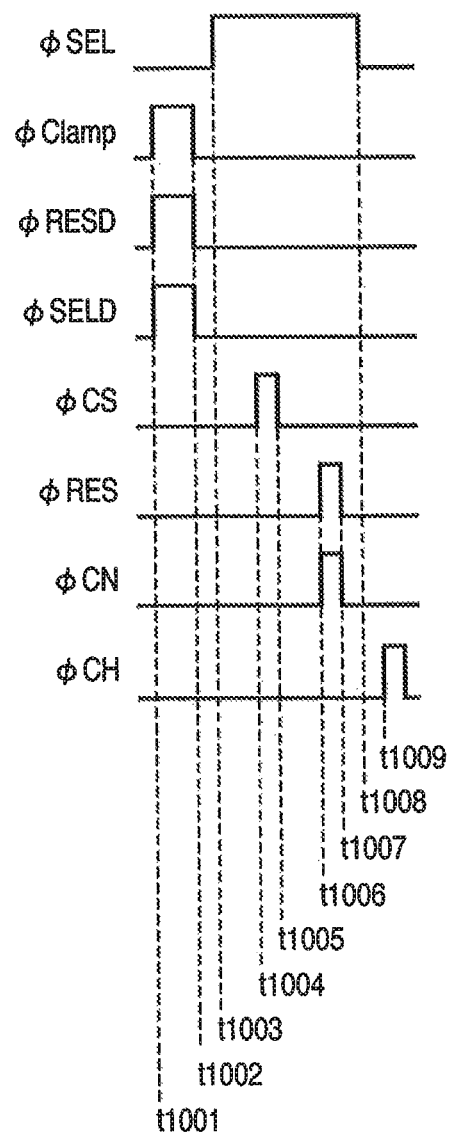
FIG. 6 is a timing chart showing a second scan sequence of the image sensing device according to the embodiment of the present invention.

FIG. 6 is a timing chart showing a second scan sequence of the image sensing apparatus of the present embodiment. When the image sensing device is driven by either the collective transfer electronic shutter shown in FIG. 13 or the rolling electronic shutter shown in FIG. 14, the second scan sequence is carried out while a pulse is being applied to the φSEL, and executed by the control circuit 209. The description here is of the readout of a single line.

As described above, with the collective transfer electronic shutter and the rolling transfer electronic shutter, after a predetermined period of time for charge accumulation, the light charges of the PD 802 of all the pixels are transferred simultaneously or at high speed to the FD 804, after which the transferred light charges are sequentially output by line. Therefore, dark signal can not be read prior to light signal like that of the first scan sequence described above. In addition, if the output of the light signal and the output of the noise signal are reversed, the noise signal will be clamped by the clamping circuit at the light signal, resulting in the output of noise signal minus light signal. In this case, if the operating range of the amplifier 604 is not wide enough, the output will fall outside the operating range of the amplifier 604. In order to ensure that the output does not fall outside the operating range of the amplifier 604, the amplifier 604 must be given an operating range, (maximum light signal) to (–maximum light signal), in which the polarity is substantially reversed, which is impractical in terms of making the image sensing apparatus inexpensive and compact. Therefore, performing scanning with the second scan sequence described below enables pixel signals to be output even during operation of the collective transfer electronic shutter or the rolling transfer electronic shutter using the output circuit shown in FIG. 4 without expanding the operating range of the amplifier 604. It should be noted that, in the following description, the dummy pixel 814 has the structure shown in FIG. 3A or FIG. 3B.

When scanning starts, first, between a time t1001 after charge accumulation ends and a time t1002 pulses are applied to (φCLAMP, φRESD and φSELD, and the reset level for the dummy pixel becomes the reference level for the clamping circuit.

Then, at a time t1003, the line for which the voltage of the FD 804 of the unit pixel 801 is to be output is selected by φSEL and between a time t1004 to a time t1005 a pulse is applied to φCS. During this time, the light charge transferred to the FD 804 is output from the pixel 801 through the source follower, clamped by the clamping circuit at the reference potential, and amplified by the amplifier 604, after which it is temporarily held in the capacitor 607.

Next, between a time 11008 and a time t1007, pulses are applied to φRES and φCN, causing the reset potential of the FD 804, from each pixel 801 on the selected line to be temporarily held in the capacitor 609 as a noise signal.

Thereafter, at a time t1008 φSEL is set to low, and φCH is set to high for each column in turn from a time t1009, thereby turning on the switches 610, 611 for each column in turn, causing, the differential amplifier 612 to subtract the noise signal from the clamped light signal, resulting in the output of a light signal with less noise.

Thus, as described above, with the collective transfer electronic shutter and the rolling transfer electronic shutter, the reset signal of the dummy pixel 814 is clamped as the reference level, causing the clamping circuit to output the light signal minus the reference level when the light charge is output. As a result, the signal values from, the clamping circuit can be kept within the operating range of the amplifier 604.

It should be noted that, if the dummy pixel 814 has the structure shown in FIG. 3C, there is no need to supply the φRESD between t1001 and t1002. Other than this, the image sensing device can be driven with a timing like that shown in FIG. 6.

With the second scan sequence, the light signal and the reset signal from the same pixel 801 are temporarily held in the capacitors 607 and 609, respectively, and the light signal from which the reset signal is subtracted is output as the final signal. Therefore, it is effective in removing fixed pattern noise from the circuit. However, because the reset is carried out and the switch 807 is operated while the light signal and the noise signal are being output, the reset noise of the reset switch 807 is added to the light signal and the noise signal.

Accordingly, in the present embodiment, in a moving image mode the collective transfer electronic shutter or the rolling transfer electronic shutter operation is carried out and scanning accomplished with the second scan sequence. By contrast, in a still image mode, in which a premium is placed on picture quality, a rolling electronic shutter operation is carried out and scanning accomplished with the first scan sequence. Thus, using different scan sequences for the moving image mode and for the still image mode as described enables an image of low distortion to be obtained without the use of a mechanical shutter in the moving image mode, and enables an image with a superior SN ratio in which the reset noise of the reset switch 807 is removed to be obtained in the still image mode. It is also possible to change the exposure time by using a mechanical shutter together with the electronic shutter in the still image mode.

It should be noted that the foregoing description is of a structure in which a dummy pixel is provided inside the image sensing device, the dummy pixel signal is taken as the reference signal, and the reference signal is clamped by a clamping circuit. However, the present invention is not limited thereto, provided that there is a signal supply circuit (independent of the dummy pixel; for example, a voltage conversion circuit or the like that takes a voltage supplied from outside the image sensing device and makes it the same voltage as a voltage generated by the dummy pixel) that outputs a reference signal to the clamping circuit.

Next, a description is given of the operation of the image sensing apparatus shown in FIG. 1 during image sensing.

When a main power supply is turned on, the control system power is turned on, and further, power to the image sensing signal processing circuit 206 and other image sensing system circuits is turned on.

If a still image mode is selected by the user and a release button, not shown, is pressed, the control circuit 209 causes the photometric device 213 to measure the amount of light and determine the brightness of the object, and the lens drive device 202 adjusts the aperture of the lens unit 201 according to the results of that determination.

Next, a high-frequency component is extracted based on a signal output from the distance measurement device 214 and the control circuit 209 calculates the distance to the object.

After that, the lens drive device 202 drives the lens unit 201, measures the distance to the object and determines whether the object is in focus or not. If not, then the lens drive device 202 again drives the lens unit 201 and measures the distance to the object.

Then, after it is confirmed that the object is in focus, image sensing starts.

Figure 7:
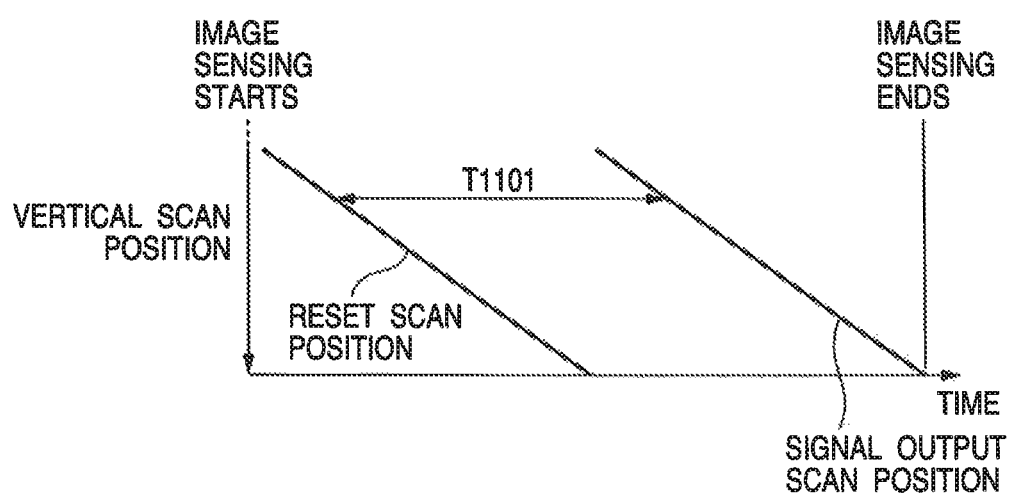
FIG. 7 is a schematic diagram showing scanning with a rolling electronic shutter according to the embodiment of the present invention.

Next, a description is given of the scan method of the image sensing device during still image sensing based on FIG. 7. The following image sensing device scanning is controlled by the control circuit 209. As described above, during still image sensing, the image sensing device is driven by rolling electronic shutter.

First, the resetting of the image sensing device 205 starts. When reset starts, a reset scan is sequentially carried out by line of the image sensing device 205. Then, after a fixed charge accumulation time T1101, reading of charges is carried out with the first scan sequence.

Figure 8:
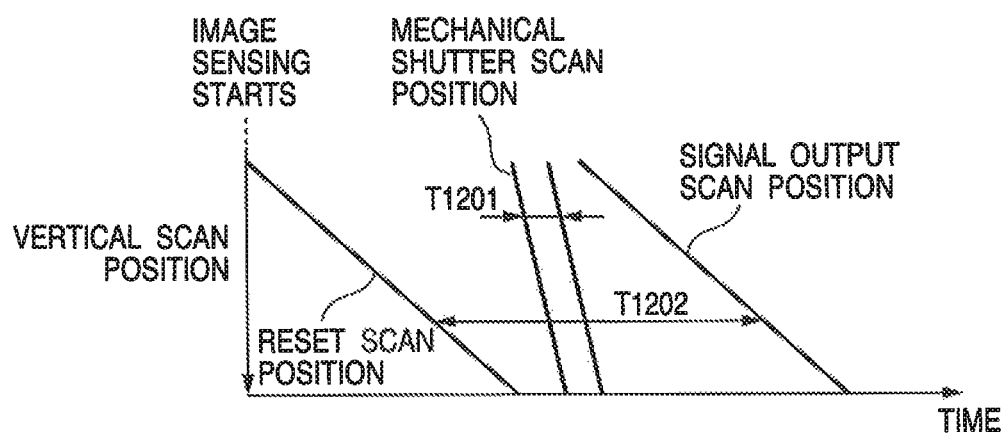
FIG. 8 is a schematic diagram showing scanning with a rolling electronic shutter using a mechanical shutter according to the embodiment of the present invention.

Next, a description is given of a scan method in a case in which a mechanical shutter is used when the image sensing device is driven with a rolling electronic shutter, based on FIG. 8.

First, the resetting of the image sensing device 205 starts. When reset starts, a reset scan is sequentially carried out by line of the image sensing device 205. Then, when the mechanical shutter is opened, image sensing device 205 exposure starts. After a charge accumulation time T1201, the mechanical shutter is closed, thereby ending the exposure of the image sensing device 205. Thereafter, reading of charges is carried out with the first scan sequence. In this case, the charge accumulation time of the image sensing device 205 is a time T1202, but the exposure time of the image sensing device 205 is T1201 by the mechanical shutter. Thus, using a mechanical shutter enables the difference in image sensing timing between the top and the bottom of the screen to be decreased.

The signals output from the image sensing device 205 by the scans shown in FIG. 7 or FIG. 8 described above are amplified and processed (A/D converted and the like) by the image sensing signal processing circuit 206, and written to the memory 208 by the control circuit 209.

The data stored in the memory 208 is recorded on the semiconductor memory or other detachable recording medium 211 through the recording medium control I/F 210 under control of the control circuit 209.

In addition, alternatively, the image may be input directly to a computer or the like through the external I/F 212 and then processed.

By contrast, if the moving image mode is selected by the user and the release button, not shown, is pressed, the control circuit 209 causes the photometric device 213 to measure the amount of light and determine the brightness of the object, and the lens drive device 202 adjusts the aperture of the lens unit 201 according to the results of that determination.

Next, a high-frequency component is extracted based on a signal output from the distance measurement device 214 and the control circuit 209 calculates the distance to the object. After that, the lens drive device 202 drives the lens unit 201, measures the distance to the object and determines whether the object is in focus or not. If not, then the lens drive device 202 again drives the lens unit 201 and measures the distance to the object.

Then, after it is confirmed that the object is in focus, image sensing starts. It should be noted that adjustment of the exposure light amount and focus adjustment is carried out at predetermined time intervals until there is an instruction to end moving image sensing.

Figure 9:
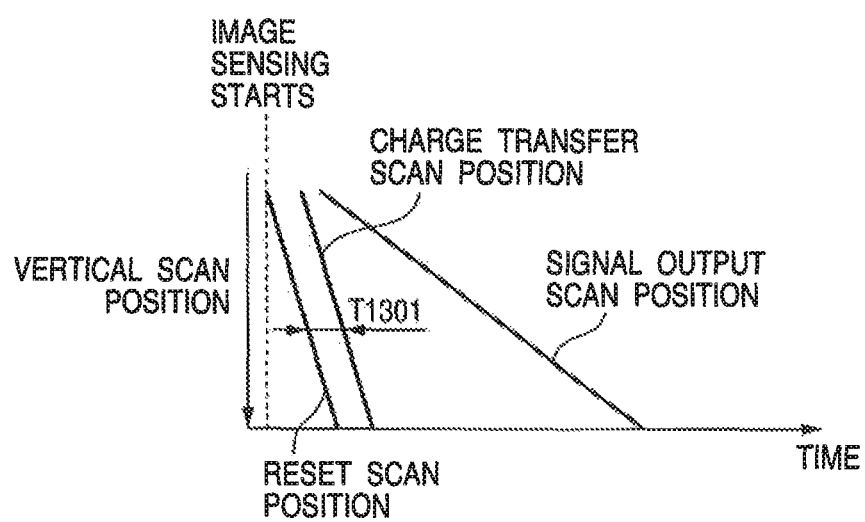
FIG. 9 is a schematic diagram showing scanning with a rolling transfer electronic shutter according to the embodiment of the present invention.
Figure 10:
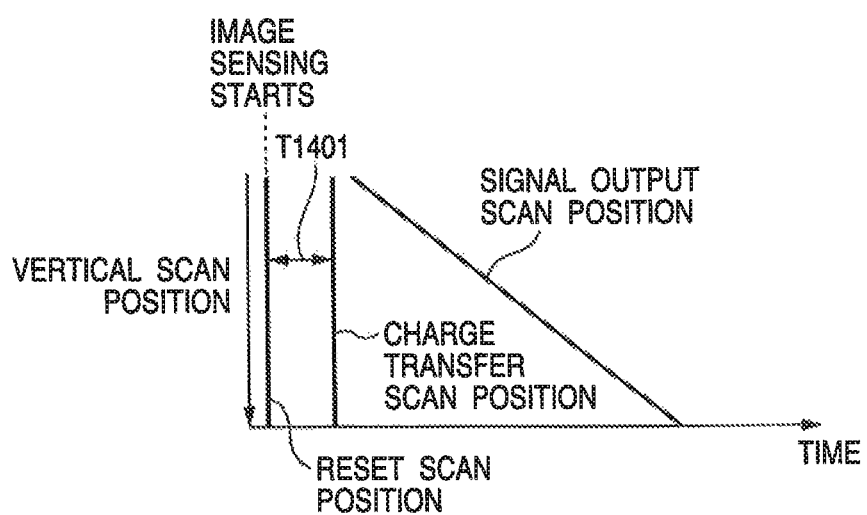
FIG. 10 is a schematic diagram showing scanning with a collective transfer electronic shutter according to the embodiment of the present invention.
Figure 11:
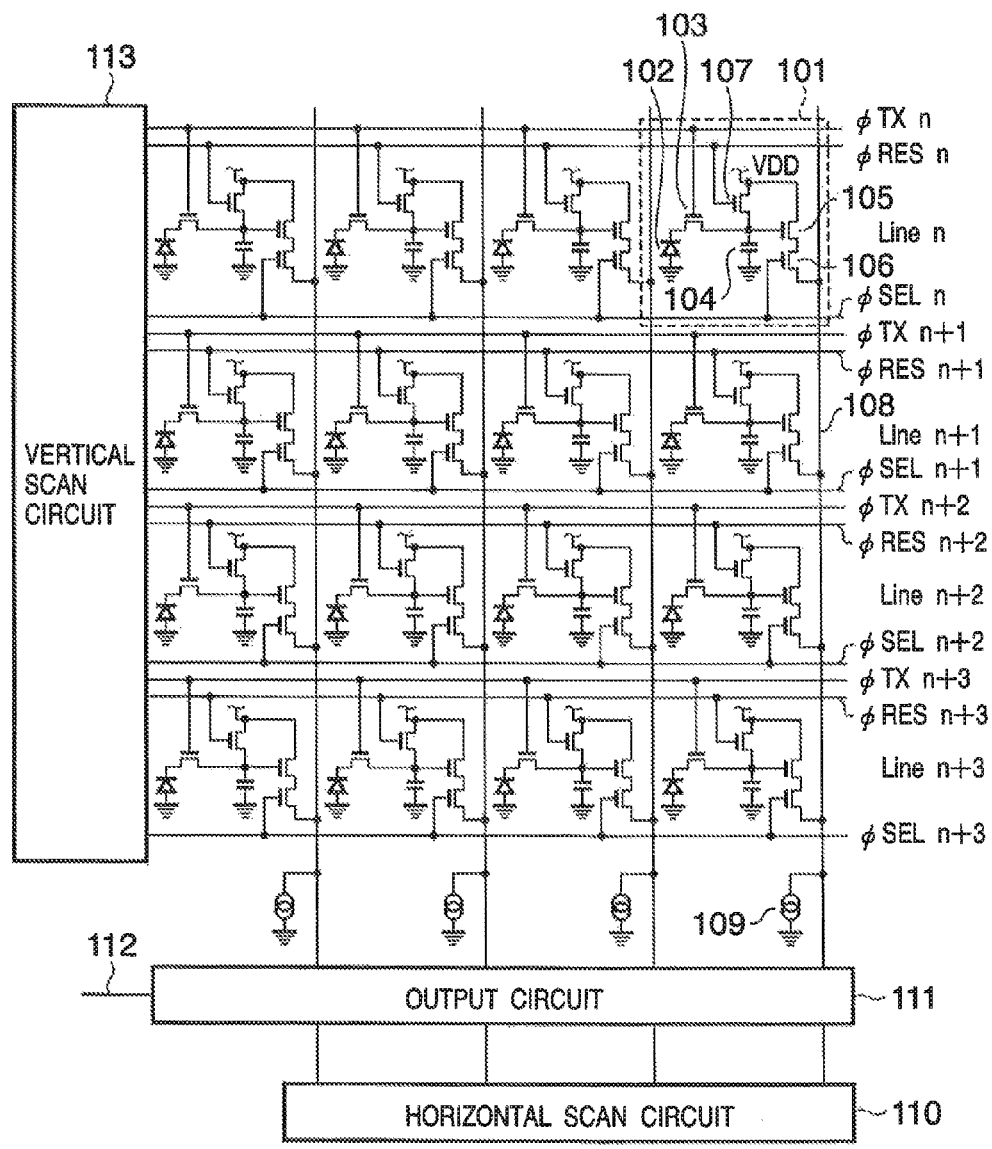
FIG. 11 is a schematic diagram showing the structure of an image sensing device employing a conventional XY address-type scan method
Figure 12:
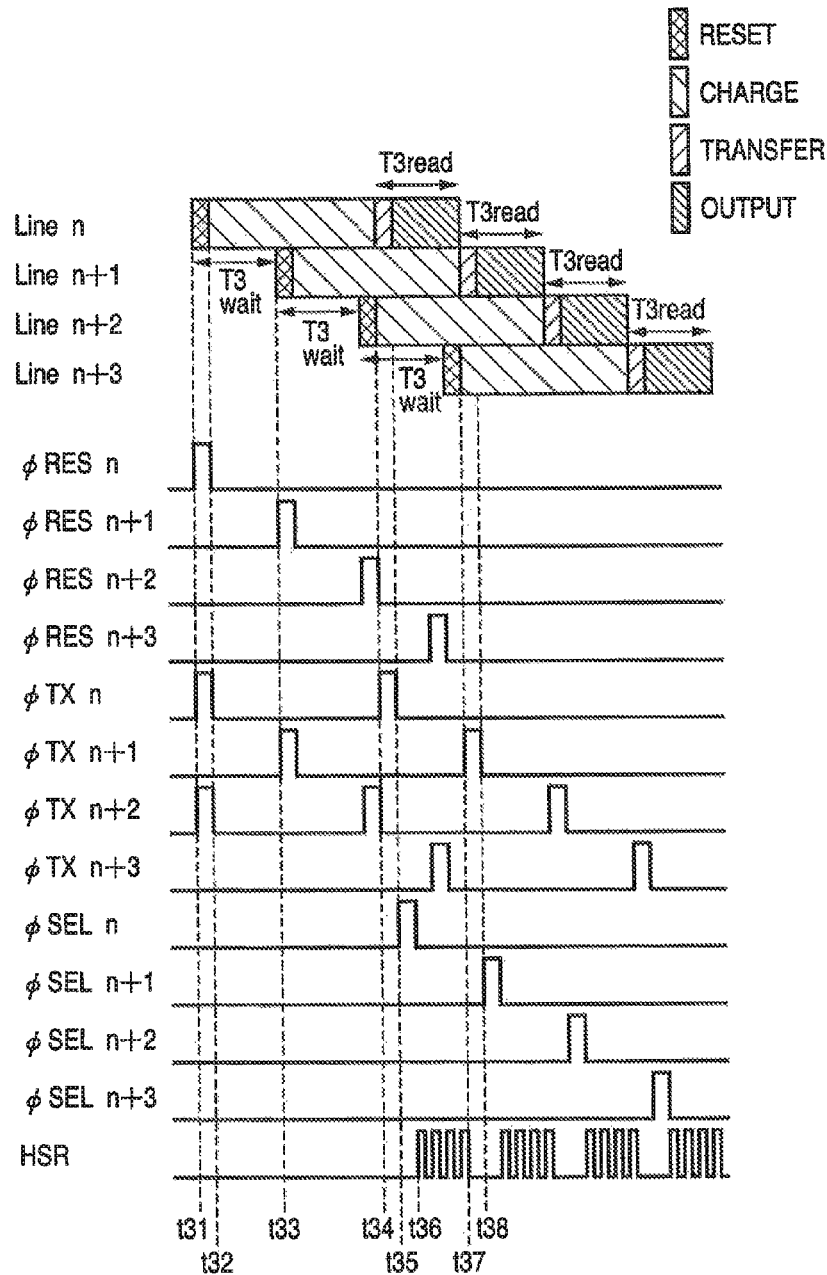
FIG. 12 is a schematic diagram showing drive pulse and sequence of operations during rolling electronic shutter operation.

Next, a description is given of the scan method of the image sensing device during moving image sensing with reference to FIG. 9 and FIG. 10.

FIG. 9 is a diagram illustrating scanning with a rolling transfer electronic shutter.

First, the resetting of the image sensing device 205 starts. When reset starts, a reset scan is sequentially carried out by line of the image sensing device 205. Then, after the reset scan, and after a predetermined charge accumulation time T1301, signal charges are transferred by line of the image sensing device 205, after which charges are read out with the second scan sequence.

FIG. 10 is a diagram illustrating scanning with a collective transfer electronic shutter.

First, the resetting of the image sensing device 205 starts. When reset starts, a reset scan is carried out for all the pixels of the image sensing device 205 simultaneously. Then, after a predetermined charge accumulation time T1401, the signal charges of all the pixels are transferred collectively, after which charges are read out with the second scan sequence.

The signals output from the image sensing device 205 by the scans shown in FIG. 9 and FIG. 10 described above are amplified and processed (A/D converted and the like) by the image sensing signal processing circuit 206, and written to the memory 208 by the control circuit 209.

The data stored in the memory 205 is recorded on the semiconductor memory or other detachable recording medium 211 through the recording medium control I/F 210.

In addition, alternatively, the image may be input directly to a computer or the like through the external I/F 212 and then processed.

The above-described embodiment enables to output signals of the same polarity from the clamping circuit when the image sensing device is driven using collective transfer electronic shutter and rolling transfer electronic shutter as when the image sensing device is driven using the rolling electronic shutter. In other words, the clamping circuit output range can be limited, and the output from the clamping circuit can be prevented from falling outside the operating range of the amplifier provided in the downstream of the clamping circuit. In addition, using the clamping circuit enables more accurate noise removal when the image sensing device is driven using rolling electronic shutter.

It should be noted that in the above embodiment, when light charge is sequentially transferred from PD to FD and light charge is sequentially read out from FD, the transfer operation and the read out operation are performed by line. However, the present invention is not limited thereto. If the image sensing apparatus has a plurality of output circuits such as the output circuits 811, the transfer operation and the read out operation can be performed by a plurality of lines.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   a plurality of pixels arranged two dimensionally, wherein each pixel includes
   (a) a photoelectric converter that converts light into signal charge,
   (b) a first floating diffusion unit that temporarily accumulates the signal charge,
   (c) a transfer switch that transfers the signal charge converted by the photoelectric converter to the first floating diffusion unit, (d) an amplifier that amplifies a voltage corresponding to the signal charge accumulated in the first floating diffusion unit, and (e) a selection switch that selects an output from the amplifier;

a dummy pixel, wherein the dummy pixel includes (a) a second floating diffusion unit, (b) an amplifier that amplifies a voltage corresponding to a reset level of the second floating diffusion unit, and (c) a selection switch that selects an output from the amplifier of the dummy pixel;

clamping circuits, each of which is provided for each column;

a signal supply circuit that supplies the reset level of the dummy pixel as a reference signal to each of the clamping circuits; and a control unit that, in a case of collectively transferring the signal charge from the photoelectric converters to the first floating diffusion units, and then sequentially outputting a light signal corresponding to the signal charge accumulated in the first floating diffusion unit in each of the plurality of pixels by a predetermined number of lines, controls to supply the reset level of the second floating diffusion unit of the dummy pixel as the reference signal from the signal supply circuit to each of the clamping circuits at a first timing, output the light signal from each pixel to each of the clamping circuits at a second timing later than the first timing, clamp the light signal at the reference signal in each of the clamping circuits at a third timing later than the second timing, output the reset level of the first floating diffusion unit as a noise signal at a fourth timing later than the third timing, and then output a difference between the clamped light signal and the noise signal at a fifth timing later than the fourth timing.

2. The image sensing apparatus according to claim 1, further comprising an amplifier that amplifies and outputs an output of each of the clamping circuits.

3. The image sensing apparatus according to claim 1, wherein, in a case of sequentially transferring the signal charge from the photoelectric converters to the first floating diffusion units by a predetermined number of lines, and then sequentially outputting the light signal from the first floating diffusion units of the plurality of pixels by a predetermined number of lines, the control unit controls to provide a noise signal from each of the plurality of pixels to each of the clamping circuits as a reference signal, and then clamp the light signal at the reference signal in each of the clamping circuits.

4. An image sensing apparatus comprising:

a plurality of pixels arranged two dimensionally, wherein each pixel includes (a) a photoelectric converter that converts light into a signal charge, (b) a first floating diffusion unit that temporarily accumulates the signal charge, (c) a transfer switch that transfers the signal charge converted by the photoelectric converter to the first floating diffusion unit, (d) an amplifier that amplifies a voltage corresponding to the signal charge accumulated in the first floating diffusion unit, and (e) a selection switch that selects an output from the amplifier;

a dummy pixel, wherein the dummy pixel includes (a) a second floating diffusion unit, (b) an amplifier that amplifies a voltage corresponding to a reset level of the second floating diffusion unit, and (c) a selection switch that selects an output from the amplifier of the dummy pixel;

clamping circuits, each of which is provided for each column;

a signal supply circuit that supplies the reset level of the dummy pixel as a reference signal to each of the clamping circuits; and a control unit that, in a case of sequentially transferring the signal charge from the photoelectric converters to the first floating diffusion units by a predetermined number of lines at a first period, and then sequentially outputting a light signal corresponding to the signal charge accumulated in the first floating diffusion unit in each of the plurality of pixels by a predetermined number of lines at a second period, with the first period being shorter than the second period, controls to supply the reset level of the second floating diffusion unit of the dummy pixel as the reference signal from the signal supply circuit to each of the clamping circuits at a first timing, output the light signal from each pixel to each of the clamping circuits at a second timing later than the first timing, clamp the light signal at the reference signal in each of the clamping circuits at a third timing later than the second timing, output the reset level of the first floating diffusion unit as a noise signal at a fourth timing later than the third timing, and then output a difference between the clamped light signal and the noise signal at a fifth timing later than the fourth timing.

5. The image sensing apparatus according to claim 4, further comprising an amplifier that amplifies and outputs an output of each of the clamping circuits.

6. The image sensing apparatus according to claim 4, wherein, in a case of sequentially transferring the signal charge from the photoelectric converters to the first floating diffusion units by a predetermined number of lines at a third period, and then sequentially outputting the light signal from the first floating diffusion units of the plurality of pixels by a predetermined number of lines at a fourth period, with the third period being equal to or longer than the fourth period, the control unit controls to provide a noise signal from each of the plurality of pixels to each of the clamping circuits as a reference signal, and then clamp the light signal at the reference signal in the each of clamping circuits.

7. A control method for an image sensing apparatus, the image sensing apparatus including clamping circuits, each of which is provided for each column, a signal supply circuit that supplies a reset level of a dummy pixel as a reference signal to each of the clamping circuits, and a plurality of pixels arranged two dimensionally, wherein each pixel includes (a) a photoelectric converter that converts light into signal charge, (b) a first floating diffusion unit that temporarily accumulates the signal charge, (c) a transfer switch that transfers the signal charge converted by the photoelectric converter to the first floating diffusion unit, (d) an amplifier that amplifies a voltage corresponding to the signal charge accumulated in the first floating diffusion unit, and (e) a selection switch that selects an output from the amplifier, and a dummy pixel, wherein the dummy pixel includes (a) a second floating diffusion unit, (b) an amplifier that amplifies a voltage corresponding to the reset level of the second floating diffusion unit, and (c) a selection switch that selects an output from the amplifier of the dummy pixel, the method comprising:

supplying the reset level of the second floating diffusion unit of the dummy pixel as the reference signal from the signal supply circuit to each of the clamping circuits at a first timing, in a case of collectively transferring the signal charge from the photoelectric converters to the first floating diffusion units, and then sequentially outputting a light signal corresponding to the signal charge accumulated in the first floating diffusion unit in each of the plurality of pixels by a predetermined number of lines;

outputting the light signal from each pixel to each of the clamping circuits at a second timing later than the first timing;

clamping the light signal at the reference signal in each of the clamping circuits at a third timing later than the second timing;

outputting the reset level of the first floating diffusion unit as a noise signal at a fourth timing later than the third timing; and outputting a difference between the clamped light signal and the noise signal at a fifth timing later than the fourth timing.

8. A control method for an image sensing apparatus, the image sensing apparatus including clamping circuits, a signal supply circuit that supplies a reset level of a dummy pixel as a reference signal to each of the clamping circuits, and a plurality of pixels arranged two dimensionally, wherein each pixel includes (a) a photoelectric converter that converts light into signal charge, (b) a first floating diffusion unit that temporarily accumulates the signal charge, (c) a transfer switch that transfers the signal charge converted by the photoelectric converter to the first floating diffusion unit, (d) an amplifier that amplifies a voltage corresponding to the signal charge accumulated in the first floating diffusion unit, and (e) a selection switch that selects an output from the amplifier, and a dummy pixel, wherein the dummy pixel includes (a) a second floating diffusion unit, (b) an amplifier that amplifies a voltage corresponding to the reset level of the second floating diffusion unit, and (c) a selection switch that selects an output from the amplifier of the dummy pixel, the method comprising:

supplying the reset level of the second floating diffusion unit of the dummy pixel as the reference signal from the signal supply circuit to each of the clamping circuits at a first timing, in a case of sequentially transferring the signal charge from the photoelectric converters to the first floating diffusion units by a predetermined number of lines at a first period, and then sequentially outputting a light signal corresponding to the signal charge accumulated in the first floating diffusion unit in each of the plurality of pixels by a predetermined number of lines at a second period, with the first period being shorter than the second period;

outputting the light signal from each pixel to each of the clamping circuits at a second timing later than the first timing;

clamping the light signal at the reference signal in each of the clamping circuits at a third timing later than the second timing;

outputting the reset level of the first floating diffusion unit as a noise signal at a fourth timing later than the third timing; and outputting a difference between the clamped light signal and the noise signal at a fifth timing later than the fourth timing.

\* \* \* \* \*